(12) United States Patent
Hossfeld et al.

(10) Patent No.: US 8,000,206 B2
(45) Date of Patent: Aug. 16, 2011

(54) PRE-EXPOSURE AND CURING OF PHOTO-SENSITIVE MATERIAL FOR OPTICAL DATA STORAGE

(75) Inventors: Wolfgang Hossfeld, Gomaringen (DE); Joachim Knittel, Tuttlingen (DE)

(73) Assignee: Thomson Licensing, Boulogne-Billancourt (FR)

( * ) Notice: Subject to any disclaimer, the term of this patent is extended or adjusted under 35 U.S.C. 154(b) by 439 days.

(21) Appl. No.: 12/225,398

(22) PCT Filed: Mar. 2, 2007

(86) PCT No.: PCT/EP2007/052009
§ 371 (c)(1),
(2), (4) Date: Sep. 19, 2008

(87) PCT Pub. No.: WO2007/107439
PCT Pub. Date: Sep. 27, 2007

(65) Prior Publication Data
US 2010/0315931 A1  Dec. 16, 2010

(30) Foreign Application Priority Data
Mar. 20, 2006 (EP) .................................. 06111388

(51) Int. Cl.
*G11B 7/00* (2006.01)
(52) U.S. Cl. ........................................................ 369/103
(58) Field of Classification Search .................. 369/103, 369/47.19; 359/10, 22, 27, 30, 32
See application file for complete search history.

(56) References Cited

U.S. PATENT DOCUMENTS

| | | | |
|---|---|---|---|
| 4,104,489 A * | 8/1978 | Satoh et al. | 369/103 |
| 4,687,720 A | 8/1987 | Wreede et al. | |
| 4,799,746 A | 1/1989 | Wreede | |
| 5,917,798 A * | 6/1999 | Horimai et al. | 369/103 |
| 6,730,442 B1 | 5/2004 | Sutherland et al. | |
| 2003/0095477 A1* | 5/2003 | Horimai et al. | 369/103 |
| 2003/0134105 A1 | 7/2003 | Toshine et al. | |
| 2004/0240015 A1 | 12/2004 | Newswanger et al. | |
| 2005/0174621 A1* | 8/2005 | Edwards | 359/32 |

(Continued)

FOREIGN PATENT DOCUMENTS

EP      0415230      3/1991

(Continued)

OTHER PUBLICATIONS

Search Report Dated Jun. 8, 2007.

*Primary Examiner* — Thang V Tran
(74) *Attorney, Agent, or Firm* — Robert D. Shedd; Jeffrey M. Navon

(57) ABSTRACT

The present invention relates to a method for performing pre-exposure and curing of a photo-sensitive material for optical data storage, in particular for holographic data storage, and to an apparatus for writing to optical storage media using such method. According to the invention, for pre-exposure and/or curing of an optical storage medium the optical storage medium is illuminated by a coherent light beam emitted by a light source, which is also used for data recording. Pre-exposure and/or curing is performed in one or more exposure steps, in which the coherent light beam carries a data pattern, the exposure dose for each exposure step being smaller than a minimum dose such that the diffraction efficiency of the recorded data pattern is too low to distinguish data from noise.

9 Claims, 4 Drawing Sheets

U.S. PATENT DOCUMENTS

Figure 1:
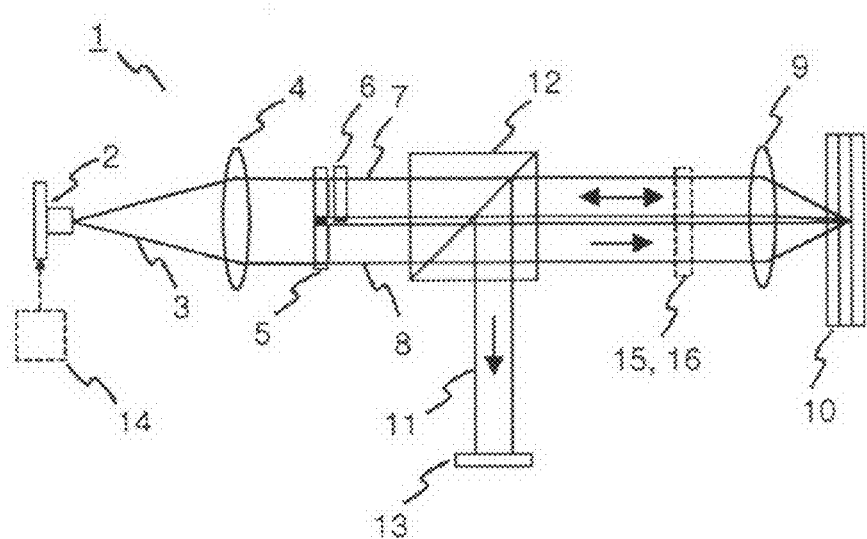

| | | | |
|---|---|---|---|
| 2007/0183009 A1* | 8/2007 | Tsukagoshi et al. | 359/10 |
| 2007/0195390 A1 | 8/2007 | Tsukagoshi et al. | |
| 2008/0088896 A1* | 4/2008 | Toishi | 359/3 |
| 2009/0147330 A1* | 6/2009 | Seo et al. | 359/11 |

FOREIGN PATENT DOCUMENTS

| | | |
|---|---|---|
| EP | 1202137 | 5/2002 |
| JP | 2005-309007 | 11/2005 |
| WO | WO 2005103839 A1 * | 11/2005 |

* cited by examiner

PRE-EXPOSURE AND CURING OF PHOTO-SENSITIVE MATERIAL FOR OPTICAL DATA STORAGE

This application claims the benefit, under 35 U.S.C. §365 of International Application PCT/EP2007/052009, filed Mar. 2, 2007, which was published in accordance with PCT Article 21(2) on Sep. 27, 2007 in English and which claims the benefit of European patent application No. 06111388.2, filed Mar. 20, 2006.

The present invention relates to a method for performing pre-exposure and curing of a photo-sensitive material for optical data storage, in particular for holographic data storage, and to an apparatus for writing to optical storage media using such method.

One concept for increasing the capacity of optical storage media is to use holographic data storage. In this case the whole volume of the holographic storage medium is used for storing information, not just a few layers as for conventional optical storage media. In holographic data storage digital data are stored by recording the interference pattern produced by the superposition of two coherent laser beams, where one beam is modulated by a spatial light modulator and carries the information to be recorded in the form of data pages.

For holographic data storage, but also for other types of optical data storage, photo-sensitive materials such as photopolymers are used for optical data recording. These materials change specific physical properties, e.g. the refractive index, in dependence on the total light energy that is locally absorbed by the material. These changes allow to record data within the material. For some materials it is necessary to pre-expose the material before data can be efficiently recorded, and to expose the material again after recording data. This last exposure or post-exposure is also known as curing or flood curing. Pre-exposure is necessary to increase the sensitivity of the material, which is needed for achieving a high recording data rate. Curing is necessary to process all unprocessed material after recording, i.e. the recorded data is fixed and the recording of additional data in the material is prevented. It is desirable that pre-exposure and curing do not lead to any detectable data structure in the material. The aim of pre-exposure is to raise the sensitivity of the material before storing data. The aim of curing is to lower the sensitivity of the material after recording data. For both pre-exposure and curing the volume of the photo-sensitive material where data is to be or has been recorded needs to be exposed to light in such a way that the resulting changes of the physical properties do not disturb the data recording quality. Usually this is achieved by exposing the material to incoherent light, which is emitted, for example, by an array of LEDs. In this way a homogeneous change of the physical properties is obtained throughout the recording volume. Using incoherent light sources an inhomogeneous exposure of the material, caused for example by interference effects, is avoided.

For example, U.S. Pat. No. 4,799,746 and U.S. Pat. No. 4,687,720 disclose methods for curing a photo-sensitive material used for holographic data storage. In both cases a special source of incoherent light is used for curing.

In the above documents a coherent light source like a laser diode is used for optical data recording. An additional source of incoherent light is used for curing. This means that two different light sources are necessary in the optical data storage system. Consequently, also two at least partially separate optical paths and two separate electronic drivers to control the light sources are needed. This complicates the optical system and raises its cost.

The document EP 0 415 230 discloses a method for pre-exposure and/or curing of an optical storage medium, wherein for pre-exposure and/or curing of the optical storage medium is illuminated by a coherent light beam. For pre-exposure and/or curing the coherence of the light beam is destroyed by moving a mirror.

It is an object of the invention to propose a simplified method for pre-exposure and/or curing of an optical storage medium.

According to the invention, this object is achieved by a method for pre-exposure and/or curing of an optical storage medium, wherein the optical storage medium is illuminated by a coherent light beam. Pre-exposure and/or curing is performed in one or more exposure steps, in which the coherent light beam carries a data pattern, wherein the exposure dose for each exposure step is smaller than a minimum dose such that the diffraction efficiency of the recorded data pattern is too low to distinguish data from noise. The coherent light beam is advantageously emitted by a light source which is otherwise used for data recording.

The idea is to dispense with the incoherent light source and to realize pre-exposure and/or curing/post-exposure with only a coherent light source, preferably the light source used for data recording. Pre-exposure and/or curing are performed in such a way that no detectable data is recorded. At the same time the resulting distribution of physical properties in the material is comparable with the distribution obtained by illumination with a source of incoherent light. This simplifies the optical data recording system and lowers its cost. In addition, curing can easily be done locally after having written data to a certain area of the optical storage medium. The invention is specifically suitable for a holographic storage medium, as many photopolymers used for these storage media require pre-exposure or curing.

A series of different suitably chosen coherent illumination steps are applied to the photo-sensitive material instead of one or more incoherent exposure steps. Each exposure is realized with an adapted intensity and/or phase distribution. The exposure dose, which is defined as the product of the total exposure intensity and the exposure time, for each exposure step is chosen smaller than a minimum dose. In this case during read-out the diffraction efficiency of the recorded data pattern is not sufficient to distinguish data from noise in the reconstructed data patterns. Preferably, the data patterns of subsequent exposure steps are random patterns. This allows to minimize the correlation of the different distributions.

Advantageously, subsequent exposure steps are performed with a constant exposure intensity but different exposure times, or with a constant exposure time but different exposure intensities. This allows to take into account the non-constant sensitivity of photopolymers, which generally depends on the total dose to which the material has been exposed before. By adjusting the exposure dose by varying the exposure time or the exposure intensity the resulting diffraction efficiency remains below a minimum value, so that no detectable data are recorded.

Advantageously, an apparatus for writing to optical storage media has means for performing a method according to the invention. These means include a random data pattern generator and/or a controller for adjusting the exposure time and/or the exposure intensity during pre-exposure and/or curing. Such an apparatus allows to realize pre-exposure and/or curing without the need for an additional incoherent light source. This greatly simplifies the optical setup.

Figure 2:
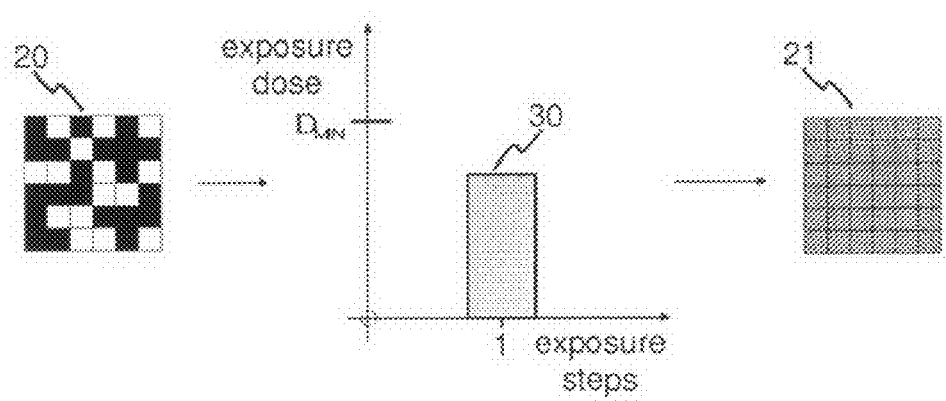
Figure 3:
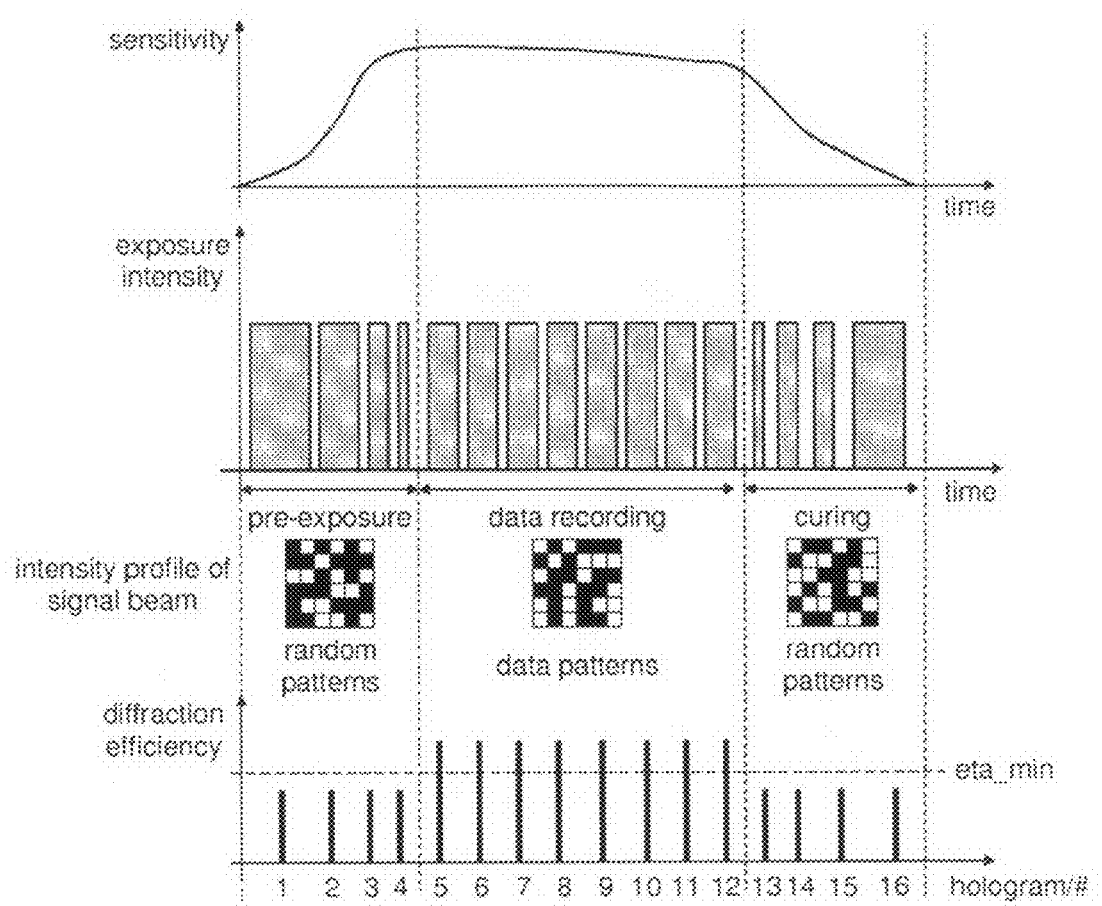
Figure 4:
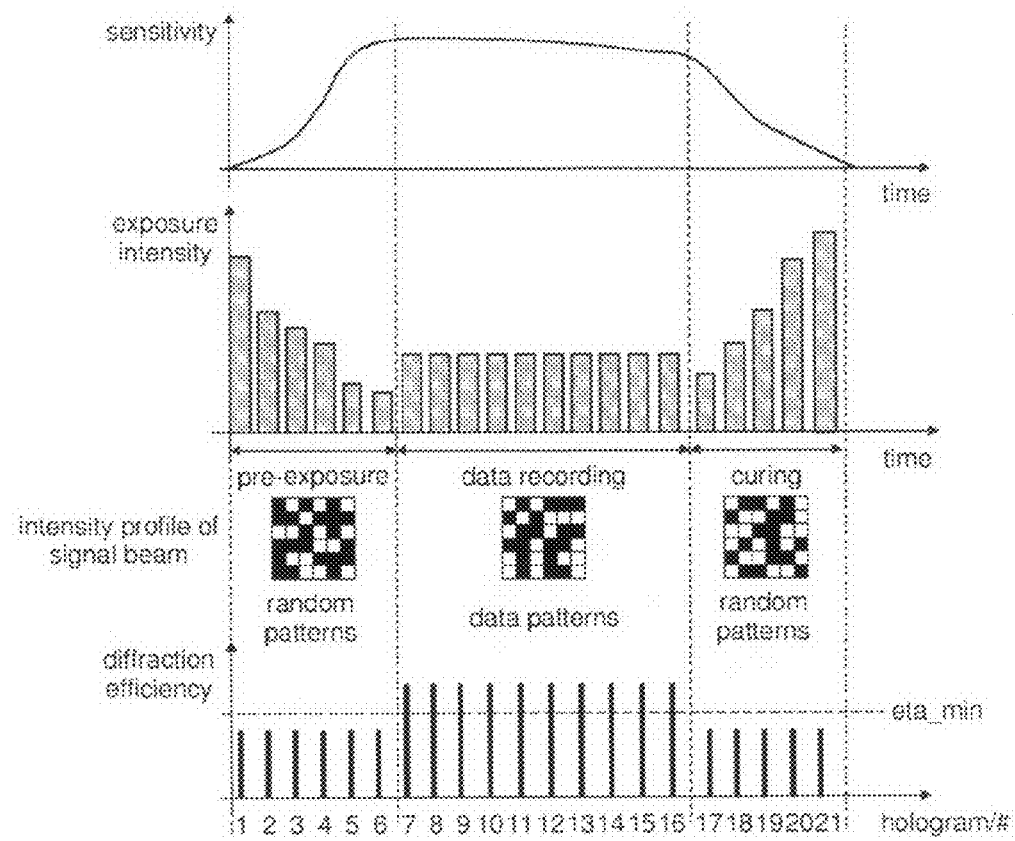
Figure 5:
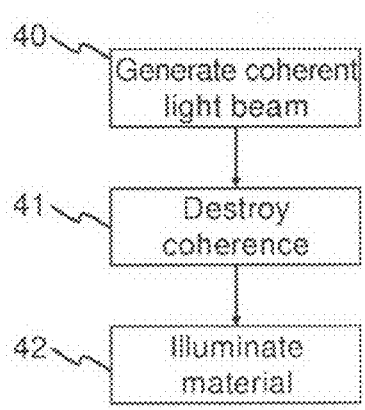
Figure 6:
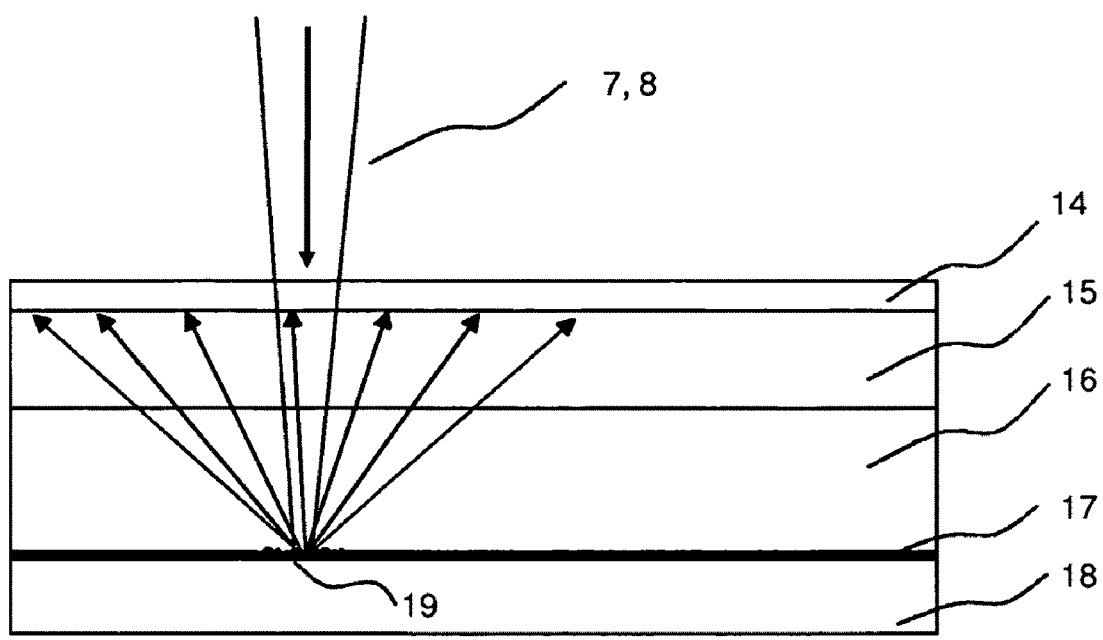

For a better understanding the invention shall now be explained in more detail in the following description with reference to the figures. In the exemplary embodiment, the invention is applied to a holographic storage medium. It is understood that the invention is also applicable to other types of optical storage media and that specified features can also expediently be combined and/or modified without departing from the scope of the present invention. In the figures:

FIG. 1 schematically depicts a holographic pickup used in a holographic storage system, FIG. 2 depicts a single exposure step for illuminating a holographic storage medium, FIG. 3 illustrates a first exposure schedule for pre-exposure, data recording and curing, FIG. 4 illustrates a second exposure schedule for pre-exposure, data recording and curing, FIG. 5 schematically depicts a method for pre-exposure and/or curing according to the prior art, and FIG. 6 shows an exemplary cross section of a holographic storage medium with special areas, which destroy the spatial coherence of a coherent light beam.

In holographic data storage digital data are stored by recording the interference pattern produced by the superposition of two coherent laser beams. An exemplary setup of a holographic pickup 1 for use in a holographic storage system is shown in FIG. 1. A source of coherent light, e.g. a laser diode 2, emits a light beam 3, which is collimated by a collimating lens 4. A modulator 14 may be connected to the laser diode 2, whose function will be explained later with reference to FIG. 5. The light beam 3 is then divided into two separate light beams 7, 8. In the example the division of the light beam 3 is achieved using a first beam splitter 5. However, it is likewise possible to use other optical components for this purpose. A spatial light modulator (SLM) 6 modulates one of the two beams, the so called "object beam" 7, to imprint a 2-dimensional data pattern. Both the object beam 7 and the further beam, the so called "reference beam" 8, are focused into a holographic storage medium 10, e.g. a holographic disk, by an objective lens 9. At the intersection of the object beam 7 and the reference beam 8 an interference pattern appears, which is recorded in a photo-sensitive layer of the holographic storage medium 10. The optical path may further include a phase modulator 15 or a diffuser 16. These elements will be explained later with reference to FIG. 5.

The stored data are retrieved from the holographic storage medium 10 by illuminating a recorded hologram with the reference beam 8 only. The reference beam 8 is diffracted by the hologram structure and produces a copy of the original object beam 7, the reconstructed object beam 11. This reconstructed object beam 11 is collimated by the objective lens 9 and directed onto a 2-dimensional array detector 13, e.g. a CCD-array, by a second beam splitter 12. The array detector 13 allows to reconstruct the recorded data.

In order to be able to distinct bright pixels of the data pattern from dark pixels the signal-to-noise ratio SNR of a bright pixel on the detector 13 has to exceed a minimum value. This means that when the signal-to-noise ratio is below the minimum value no data can be detected, as the recorded data cannot be distinguished from noise. Data should thus be recorded in such a way that during read-out the signal-to-noise ratio exceeds the minimum value. In the above exemplary holographic storage system this is achieved by recording the holograms with a sufficiently large exposure dose. The diffraction efficiency of one hologram can be controlled by choosing the right dose for the recording exposure. Due to the non-constant sensitivity of photopolymers the dose to achieve a desired diffraction efficiency generally depends on the total dose to which the material has been exposed before. Knowing this specific function the dose can be adjusted in order to control if the recorded data can be read or not.

Based on FIGS. 2 to 4 a first aspect of the invention shall now be explained. In FIG. 2 the photo-sensitive material is illuminated with coherent light beam carrying a data page 20 in a single exposure step 30. The exposure dose D, which is defined as the product of the total exposure intensity and the exposure time, for this single exposure step 30 is chosen smaller than a minimum dose D_min. In this case during read-out the diffraction efficiency of the recorded hologram is too low to distinguish data from noise in the reconstructed data page 21.

The above finding can now be used for pre-exposure and/or curing of a photo-sensitive material, e.g. a photopolymer. The single exposure step is repeated several times in order to achieve a desired total exposure dose for pre-exposure or curing. Each exposure is realized with a well-chosen intensity and/or phase distribution of the coherent exposure wave(s). The set of different distributions is chosen in such a way that the sum of coherent exposures leads to approximately the same change of the physical properties of the material as the incoherent exposure(s). This is preferably achieved by minimizing the correlation of the different distributions. For example, random patterns have a low correlation and are thus well-suited for this application.

A first exemplary exposure schedule for pre-exposure, data recording and curing is shown in FIG. 3. The upper graph indicates the sensitivity of the material, which is influenced by the subsequent exposures. The next lower graph indicates the exposure intensity against time, i.e. the rectangles in the graph are a measure of the exposure dose. Still further below exemplary data patterns are shown. During pre-exposure and curing random patterns are used, while during recording normal data patterns are used. The lower graph illustrates the diffraction efficiency of the data pattern recorded during each exposure step. The hologram number indicates the number of exposure steps at the specific position of the holographic storage medium during pre-exposure and curing. During data recording, the number indicates the number of multiplexed holograms at the specific position of the holographic storage medium. According to this exposure schedule during pre-exposure and curing a constant exposure intensity of the coherent light beams is used. The exposure dose is controlled by changing the exposure time for the individual holograms. During pre-exposure and curing the exposure time is chosen such that the resulting diffraction efficiency remains below a minimum value eta_min, so that no detectable data are recoded. As during pre-exposure the material sensitivity increases, the exposure time of subsequent exposure steps is reduced in order to keep the diffraction efficiency below the minimum value. To the contrary, during curing the material sensitivity decreases. Therefore, the exposure time of subsequent exposure steps is increased while still keeping the diffraction efficiency below the minimum value. During actual data recording a larger exposure time is used. The resulting diffraction efficiency in this case exceeds the minimum value eta_min.

A second exemplary exposure schedule for pre-exposure, data recording and curing is shown in FIG. 4. According to this exposure schedule during pre-exposure and curing a constant exposure time of the coherent light beams is used. The exposure dose is controlled by changing the exposure intensity for the individual holograms. During pre-exposure and curing the exposure intensity is chosen such that the resulting diffraction efficiency remains below a minimum value eta_min, so that no detectable data are recoded. In analogy to the example in FIG. 3, in this case during pre-exposure the exposure intensity of subsequent exposure steps is reduced in order to keep the diffraction efficiency below the minimum value, while during curing the exposure intensity of subsequent exposure steps is increased. During actual data recording a larger exposure intensity is used. The resulting diffraction efficiency in this case exceeds the minimum value eta_min. Of course, it is likewise possible to vary both the exposure time and the exposure intensity during pre-exposure and curing.

In both exemplary exposure schedules the sum of the exposures using a series of random distributions during pre-exposure and/or curing causes a nearly homogeneous change of the physical properties, e.g. the refractive index, in the volume. This leads to a uniform change of the sensitivity in the recording volume.

According to a known solution, which is schematically described in the flow chart of FIG. 5, during pre-exposure and/or curing the photo-sensitive material is illuminated 42 by an incoherent light beam, which is obtained by destroying 41 the coherence of the coherent light beam emitted 40 by a laser diode, which is otherwise used for recording. For reducing or even destroying the temporal coherence, the laser diode generating 40 the coherent light beam is modulated by a high-frequency modulator 14. Several solutions exist for reducing or destroying the spatial coherence. According to a first solution, the position and/or the tilt of the objective lens 9 relative to the optical storage medium 10 is modulated via an actuator. This leads to a more homogeneous intensity distribution and does not require any additional hardware. A further solution is to modulate the optical path difference between the reference beam 8 and the signal beam 7. For this purpose a phase modulator 15 is introduced into one of the beams 7, 8. Still a further solution is to introduce a rotating phase plate, i.e. a diffuser 16, into the optical path. All solutions average out any remaining coherence effects.

A further solution is to provide the holographic storage medium with special areas, which destroy at least the spatial coherence of the coherent light beam 7, 8. An exemplary cross-section of such a holographic storage medium 10 is depicted in FIG. 6. Also illustrated is the propagation of a coherent beam 7, 8 during pre-exposure or curing. The beam 7, 8 travels through a cover layer 14, a holographic storage material layer 15, and a spacer layer 16. The holographic storage medium 10 further has a reflective layer 17 and a substrate 18. The optical axis of the coherent beam 7, 8 is chosen in such a way that the beam 7, 8 does not impinge on the reflective layer 17, but on a special area 19. The focus of the coherent beam 7, 8 is preferably situated in the special area 19. This allows to keep the special area 19 very small. The area 19 destroys at least the spatial coherence of the coherent light beam 7, 8. This may be achieved, for example, by realizing the special area 19 as a rough reflective area. When the reference beam 8 is used for pre-exposure and curing, it is preferably irradiated aslant into the holographic storage medium 10. In this case during recording of a hologram the diffuse reflected reference beam 8 performs pre-exposure of the adjacent holographic storage material used for subsequent holograms.

The invention claimed is:

1. A method for pre-exposure or curing of an optical storage medium, the method comprising the steps of:
   generating a coherent light beam,
   imprinting a first spatial intensity or phase distribution over a cross section of the coherent light beam,
   illuminating an area of the optical storage medium with the coherent light beam having the first spatial intensity or phase distribution in a first exposure steps,
   imprinting a second spatial intensity or phase distribution over the cross section of the coherent light beam, wherein the first and the second spatial intensity or phase distributions have a low correlation, and
   illuminating the area of the optical storage medium with the coherent light beam having the second spatial intensity or phase distribution in a second exposure step,
   wherein an exposure dose of the first exposure step and an exposure dose of the second exposure step are smaller than an exposure dose required for recording a detectable data pattern.

2. The method according to claim 1, wherein the coherent light beam is generated by a light source, which is otherwise used for data recording.

3. The method according to claim 1, wherein the first exposure step and the second exposure steps are performed with a constant exposure intensity but different exposure times, or with a constant exposure time but different exposure intensities.

4. The method according to claim 1, wherein the optical storage medium is a holographic storage medium.

5. An apparatus for writing to optical storage media, the apparatus comprising:
   a light source for generating a coherent light beam,
   a spatial light modulator for imprinting one of at least a first spatial intensity or phase distribution and a second spatial intensity or phase distribution over a cross section of the coherent light beam,
   an objective lens for illuminating an area of the optical storage medium with the coherent light beam having the first spatial intensity or phase distribution in a first exposure step and for illuminating the area of the optical storage medium with the coherent light beam having the second spatial intensity or phase distribution in a second exposure step, and
   a controller for adjusting an exposure dose of the first exposure step and an exposure dose of the second exposure step,
   wherein an exposure dose of the first exposure step and an exposure dose of the second exposure step are smaller than an exposure dose required for recording a detectable data pattern.

6. The apparatus according to claim 5, wherein the light source for generating the coherent light beam is otherwise used for data recording.

7. The apparatus according to claim 5, wherein the controller is adapted to adjust the exposure dose of the first exposure step and the exposure dose of the second exposure step by setting a constant exposure intensity but different exposure times for the first and the second exposure steps.

8. The apparatus according to claim 5, wherein the controller is adapted to adjust the exposure dose of the first exposure step and the exposure dose of the second exposure step by setting a constant exposure time but different exposure intensities for the first and the second exposure steps.

9. The apparatus according to claim 5, wherein the optical storage medium is a holographic storage medium.

* * * * *